United States Patent Office
3,073,116
Patented Jan. 15, 1963

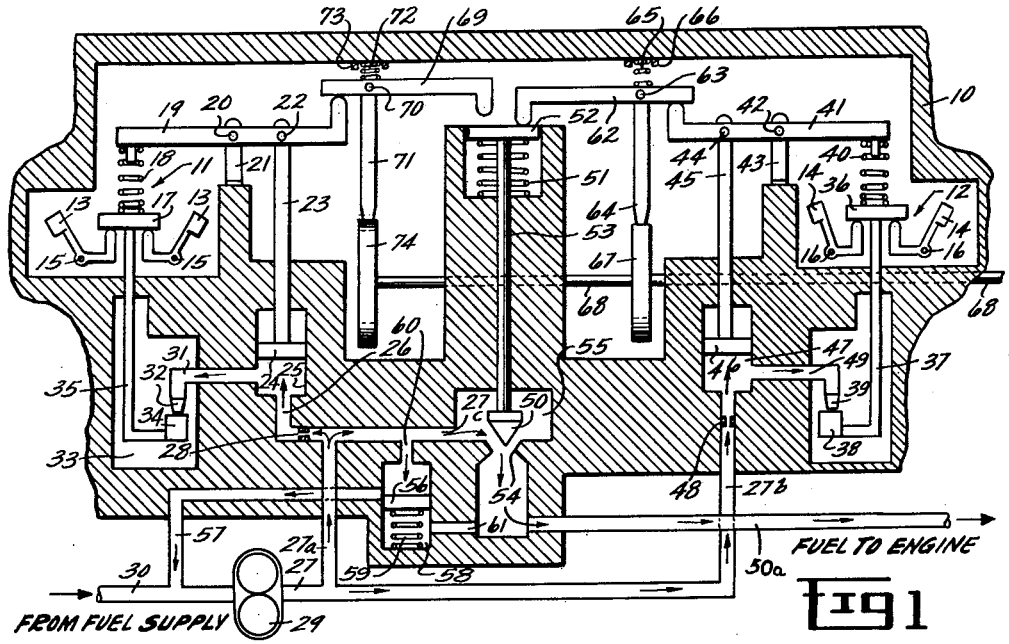

3,073,116
VARIABLE GOVERNOR DATUM SETS FOR A TWIN SPOOL GAS TURBINE FUEL CONTROL
Robert Frank Owens, West Newbury, Mass., assignor to General Electric Company, a corporation of New York
Filed Dec. 31, 1959, Ser. No. 863,252
4 Claims. (Cl. 60—39.16)

My invention relates to control systems for gas turbine engines and has particular application to gas turbine engines of the free power turbine type in which the power output of the engine is extracted in mechanical form from a free power turbine.

Engines of the foregoing type typically comprise mechanically independent rotating elements in the form of a gas generator turbine and compressor element and a free power turbine element which drives the load. Engines of this type may be utilized to drive various kinds of loads such as a propeller, in which case the engine is generally referred to as a turboprop engine, or the rotor of a helicopter, in which case the engine is usually called a turboshaft engine. Although such engines may be utilized to drive other types of loads, I will for purposes of explanation limit my preliminary discussion to the two general kinds of applications mentioned above; that is, turboprop and turboshaft applications.

In the case of a turboprop engine of the free turbine type, the control system approach that is generally followed calls for the pilot to set a particular desired propeller speed and then manually regulate the speed of the gas generator unit to control the amount of power delivered to the free turbine. In the process, the propeller pitch control system automatically adjusts the propeller pitch to maintain the preset propeller speed. The gas generator speed is regulated at the level corresponding to the particular throttle setting by means of a speed control system which automatically adjusts the fuel flow rate to the engine in response to deviations in the gas generator speed from the preset level. In addition, because under certain conditions the propeller, although set at maximum pitch, may be unable to absorb the power delivered to it by the engine without exceeding the maximum design speed limit of the propeller or the free turbine which drives it, a topping or speed limiting control is usually provided to limit the propeller or free turbine speed to some preselected maximum level. The free turbine speed limiting control operates to limit the fuel flow rate to the engine when the free turbine speed exceeds the preselected maximum level.

Thus in the typical turboprop application, the speed of the engine gas generator is regulated at some preset level determined by the throttle setting while the speed of the free turbine is regulated by the propeller pitch control subject to a topping control which limits fuel flow to the engine to limit the free turbine speed to a preselected maximum level.

On the other hand, in the case of a helicopter application utilizing a free turbine engine, the typical control approach calls for the pilot to set a desired speed of the helicopter rotor and then to control the power output of the engine by manually adjusting the pitch of the rotor blades. The preset rotor speed is maintained automatically by a control which adjusts the fuel flow rate to the engine as the pitch of the rotor is varied by the pilot.

In this kind of installation, it is possible under certain conditions for the rotor speed control to schedule a fuel flow rate to the gas generator which would cause the gas generator to exceed its maximum design operating speed. It is therefore a usual practice to provide a topping or speed limiting control which adjusts fuel flow in response to gas generator overspeed conditions to limit the gas generator speed to some preselected maximum level.

Now it will be observed from the foregoing discussion that in both the turboprop and the turboshaft applications, both the gas generator and the free turbine must be provided with speed sensing elements. In the turboprop case, however, the speed control of the gas generator must control fuel flow to regulate speed throughout the normal speed range corresponding to the various throttle settings, whereas in the turboprop case the gas generator speed control must remain inoperative throughout the normal gas generator speed range and act only to limit fuel flow to prevent an overspeed condition. Similarly, it will be observed that in the turboprop case the free turbine speed control must remain inoperative throughout the normal speed range, insofar as regulation of fuel flow is concerned, and act only as a speed limiting control, while in the turboshaft case it is called upon to regulate fuel flow throughout the normal free turbine operating speed range to maintain a preset output speed.

Now in many cases it is considered desirable to provide a gas turbine engine of the free turbine type which is adaptable to both turboprop and turboshaft applications. Because of the basic differences in the operation of the engine control system between the two applications, however, it has usually been considered necessary to provide either entirely different control systems, or, where a single control is provided, to require substantial modifications in the control to adapt it from one type of application to the other.

It is an object of my invention to provide an improved control system for gas turbine engines of the free power turbine type which is adaptable to both turboprop and turboshaft types of control requirments with only very minor modifications.

I accomplish this and other objects of my invention, in one embodiment thereof, by providing a pair of speed sensing elements, one of which is connected to respond to gas generator speed and the other of which is connected to respond to free turbine speed. Each of these speed sensing elements is connected through a control loop such that it may be set either to regulate fuel flow to the engine throughout its operating speed range or to remain inoperative throughout its normal speed range and to act only to limit fuel flow in response to an overspeed condition. In one embodiment of my invention, I accomplish this by connecting the two speed control loops together through a common fuel flow control point and making provisions for setting either of the two loops, by means of minor modifications, to either control speed throughout its speed range or to limit speed to some preselected maximum level.

Other objects and advantages of my invention will become apparent from the following description taken in connection with the accompanying drawing in which:

FIG. 1 is a cross sectional view of a portion of a gas turbine engine fuel control system embodying my invention, and FIG. 2 is an illustration of a portion of the system shown in FIG. 1, showing an alternative embodiment of my invention, and FIG. 3 shows a portion of the embodiment of FIG. 1 with certain modifications adapting it to an alternative mode of control.

Referring now to FIG. 1, I have illustrated the fuel flow control portion of a gas turbine engine control embodying my invention. The elements illustrated are enclosed and supported in a casing member 10. Mounted in the casing 10 are two speed governors 11 and 12, and for purposes of explanation, I will designate the governor 11 as being connected to respond to the engine gas generator speed and the governor 12 as being connected to respond to the engine turbine speed. As I have pointed out above, the gas generator and the free turbine in this type of engine are mechanically independent rotating elements with the free turbine being connected to drive a load and to receive the hot gases discharged from the gas generator portion of the engine.

The governors 11 and 12 are of the conventional flyweight type comprising respectively centrifugally actuated flyweights 13 and 14 pivotally mounted at 15 and 16 on rotatable spindles (not shown) which are driven through suitable mechanical connections by the gas generator and the free turbine respectively. Referring now to the governor 11, it will be observed that the flyweights 13 are mounted to bear against and control the position of a flange 17 against the force of a reference spring 18.

The reference spring 18 bears at its upper end against a link 19 which is pivotally mounted at 20 on a supporting post 21 carried by the casing 10. Pivotally connected at 22 to the link 19 is an arm 23 which has secured at its lower end a piston 24 positioned for sliding movement within a cylinder 25 formed in the casing 10.

High pressure fuel is supplied to the cylinder 25 through passages 26, 27, 27a and a series connected orifice 28 from a pump 29 which receives fuel from the main supply through a conduit 30. Fuel is discharged from the cylinder 25 through a conduit 31 and a discharge orifice 32 into a chamber 33 which is connected back to the system drain through suitable passages, not shown. The fluid flow rate through the discharge orifice 32 is controlled by a flapper element 34 which is secured to a link 35. The link 35 is secured to the flange 17 such that it is positioned vertically by the action of the governor 11.

It will be observed that the fluid pressure in the cylinder 25 is determined by the discharge pressure of the pump 29 and the pressure drop across the orifice 28. The pressure drop across the orifice 28 is, on the other hand, determined by the fluid flow rate through it, which is established by the position of the flapper element 34 relative to the discharge orifice 32. In other words, as the flapper 34 is moved closer to the discharge orifice 32, the restriction on flow through the orifice 32 is increased thereby reducing the flow through the orifice 28 and reducing the pressure drop across it, causing the pressure in the cylinder 25 to be increased. Moving the flapper 34 away from the discharge orifice 32 increases the flow through it causing an increase in the pressure drop across the orifice 28 and a decrease in pressure in the cylinder 25.

To explain the action of the governor 11 and its associated mechanism consider an increase in speed which causes the flyweights 13 to move radially outward, forcing the flange 17, the link 35 and the flapper 34 in an upward direction against the force of the spring 18. It will be observed that this moves the flapper 34 closer to the discharge orifice 32, thereby increasing the pressure in the cylinder 25. The increased pressure in the cylinder 25 forces the piston 24 and the link 23 in an upward direction, thereby pivoting the link 19 in a counterclockwise direction on its pivot 20 against the force of the spring 18. Upward movement of the piston 24 continues until the spring 18 has been compressed to a point where a force balance is achieved and a new equilibrium position established.

It will be observed that in the sequence just described, there is some resetting or feedback action applied to reposition the flapper 34 through the increased force applied by the spring 18 against the opposing force generated by the flyweights 13. The degree of feedback action may be selected in any given case to achieve the overall gain or sensitivity desired. The net result, however, is that a counterclockwise movement of the link 19 about its pivot 20 is produced by an increase in speed from an equilibrium position. Similarly, it will be observed that a decrease in speed causes the flapper 34 to move away from the orifice 32 thereby causing a decrease in pressure in the cylinder 25 and allowing the link 19 to pivot in a clockwise direction under the influence of the unbalance force produced by the spring 18.

The mechanism associated with the governor 12 is of a similar form, comprising a flange 36 the position of which is controlled by the governor, a link 37 secured to flange, and a flapper 38 carried by the flange and positioned to regulate fluid flow through a discharge orifice 39.

The position of the flange 36 is controlled by the flyweights 14 against a reference spring 40, which bears against a link element 41 pivotally mounted at 42 on a support post 43. Pivotally connected at 44 to the link 41 is an arm 45 which carries at its lower end a piston 46 positioned for slidable movement in a cylinder 47 formed in the casing 10. Fuel under pressure is supplied to the cylinder 47 from the supply pump 29 through conduits 27 and 27b and a series connected orifice 48. Fuel is discharged from the cylinder 47 through a conduit 49 which communicates with the discharge orifice 39.

It will be observed that the operation of the governor 12 and its associated mechanism is the same as that of the governor 11 as described above in that an increase in the speed of the governor 12 produces an upward movement of the flapper 38, increasing the pressure in the cylinder 37 causing clockwise movement of the link 41 around its pivot 42, while a decrease in speed causes counterclockwise movement of the link 41 around the pivot 42.

Fuel flow to engine through a conduit 50a is controlled by a valve 50, which is spring loaded in the open direction by a spring 51 which bears against a flange portion 52 located at the top of the valve stem 53. The valve 50 is positioned to regulate the effective flow area of a passage 54 to control the fuel flow rate through it. Fuel is supplied to the valve chamber 55 from the pump 29 through conduits 27, 27a and 27c.

In order to make fuel flow substantially directly proportional to the controlled area of the passage 54, the pressure drop across the passage is held substantially constant by means of a pressure controlled by-pass piston 56, which controls the expanded area of a by-pass conduit 57. The piston 56 is positioned for sliding movement within a cylinder 58 and is spring loaded in the upward direction by means of a spring element 59.

The fuel pressure on the upstream side of the passage 54 is applied to the upper side of the piston 56 through a passage 60, while the pressure on the downstream side of the orifice 54 is applied to the lower surface of the piston 56 through passage 61. Thus the position of the piston 56 in the cylinder is determined by the pressure difference across it, which is the pressure drop across the passage 54, acting against the force of the spring 59.

Thus, the piston 56 acts to control the exposed area of the by-pass conduit 57 to regulate the pressure drop across the passage 54 to some preselected level. If the pressure drop increases beyond the preselected level, the piston is forced downwardly, increasing bypass flow and thereby reducing the flow through and the pressure drop across the passage 54 to restore it to the preselected level. On the other hand, if the pressure drop across the passage 54 decreases below the preselected level, the piston is moved upwardly by the spring 59 against the reduced pressure force to close off the bypass conduit until the flow through the passage 54 is increased sufficiently to restore the pressure drop across passage 54 to its original level. The fuel flow rate through the passage 54 is thus made substantially directly proportional to the effective area of the passage, which is in turn controlled by the position of the valve 50.

The position of the valve 50, and hence the fuel flow rate to the engine, is controlled by a lever 62, which is pivotally mounted at 63 on a rod element 64. The rod 64 is spring loaded by means of a spring 65, mounted in a socket 66, against a cam 67. The angular position of the cam 67 is controlled by a shaft 68 to which the cam is secured and which is manually adjusted by the pilot or engine operator to control the power output of the engine. The cam 67 is shaped in such a manner that rotating it in one direction or the other either raises or lowers the pivot point 63 in accordance with a preselected schedule.

Also capable of controlling the position of the valve 50 but held in a limiting position is a second lever 69 pivotally mounted at 70 on a rod 71. The rod 71 is spring loaded, by means of a spring 72 mounted in a socket 73, against a cylindrical disk 74 having an outer surface which is at a uniform radius around its periphery with respect to the center of rotation of the shaft 68. The disk 74 is secured to the shaft 68 and rotates with it, but because of its uniform radius, holds the pivot point 70 in a fixed position with rotation of the shaft 68, whereas rotation of the cam 67 causes the pivot point 63 to move up or down in accordance with the schedule determined by the cam shape.

Now it will be shown that resetting the position of the pivot point 63 resets the speed reference level maintained by the governor 12 and its associated mechanism. This may be explained as follows.

With the elements initially in an equilibrium position, assume that the cam 67 is rotated by the shaft 68 in response to a throttle movement in a direction to cause the pivot point 63 to move upwardly by a given increment. It will be recalled that for purposes of explanation, the governor 12 is assumed to be driven by the free turbine of the engine.

Because the left hand end of the lever 62 is spring loaded in the upward direction, the initial effect of the upward movement of the pivot 63 is to allow upward movement of the flange 52 along with the spindle 53 and valve 50, thereby increasing the fuel flow rate to the gas generator portion of the engine. This increases the speed of the gas generator, thereby increasing the flow rate of hot gas delivered to the free turbine and in turn causing its speed to increase.

As the speed of the governor 12 increases along with the increasing free turbine speed, the rod 37 is moved upwardly, restricting the discharge orifice 39 and increasing the pressure in the cylinder 47, thereby causing the piston 46 to move the link 41 in a clockwise direction around the pivot 42. Clockwise movement of the link 41 causes counterclockwise movement of the lever 62 thereby moving the flange 52 and valve 50 downward to decrease the fuel flow rate. This process continues until a new equilibrium position is reached.

It will be observed, however, that in order to return the valve 50 to its original position and thus adjust the fuel flow rate back to its original level, the governor must reach a speed higher than that at which it was operating before the upward adjustment of the setting of the pivot point 63. Thus for any given load on the free power turbine corresponding to a given fuel flow, an upward adjustment of the setting of the pivot point 63 requires the governor to operate at a higher reference speed in order to schedule the same fuel flow rate. Similarly it can be shown that downward movement of the pivot point 63 causes a reduction in the governor reference speed. The reference speed at which the power turbine is to be scheduled to operate may therefore be adjusted by rotating the cam 67 through the agency of the shaft 68 to raise or lower the pivot point 63. During this process, however, the position of pivot point 70 remains fixed, as has been explained above.

Now it will be observed that as the speed of the free turbine is adjusted by manual rotation of the shaft 68, the speed of the gas generator is also affected by reason of the corresponding change in fuel flow rate. In other words, if the shaft 68 is rotated in a direction to raise the pivot point 63 to increase free turbine speed, the effect of increased free turbine speed is produced by increasing the fuel flow rate to the gas generator and thereby increasing its speed. Similarly an adjustment of the shaft 68 to decrease free turbine speed results in a decrease in gas generator speed. In addition, the speed regulating function of free turbine governor 12 and its associated mechanism is accomplished through the regulation of the fuel flow rate to the gas generator in order to control gas generator speed to the level required to supply the proper flow rate of hot gas from the gas generator to the free turbine.

Throughout this process, the gas generator governor 11 responds to variation in gas generator speed in the manner already explained above. However, the position of the pivot point 70, which is determined by the radius of the disk 74, is selected so that within the normal operating speed range of the gas generator, the lever 69 remains out of contact with the flange 52 such that the gas generator speed parameter does not exercise any influence on the fuel flow rate scheduled by the free turbine speed control loop.

It will be observed, however, that at some preselected fuel flow rate, corresponding to a position of the flange 52, and resulting gas generator speed represented by a position of the lever 69, the lever 69 engages the flange 52 such that any further clockwise movement of the lever 62 or upward movement of its pivot point 63, calling for a still further increase in gas generator speed, is ineffective to increase of the fuel flow rate because the flange 52 of the flow control valve 50 is restrained against movement in the upward direction by the lever 69.

Thus with the system arranged as shown in FIG. 1, the speed of the free turbine may be adjusted manually by rotating the shaft 68, the fuel flow to the gas generator then being regulated by the free turbine speed control to maintain the speed of the free turbine at the preset level, while the gas generator control serves only to limit the fuel flow rate in response to an overspeed condition. It will be recalled that this conforms to the control philosophy commonly followed in helicopter applications wherein the power plant is a free turbine engine.

Now in the event it is desired to convert the system of FIG. 1 to a turboprop type of application wherein it is desired to manually adjust gas generator speed and utilize free turbine speed only to limit fuel flow responsive to an overspeed condition, cam 67 and disk 74 may be replaced to interchange the functions of speed governing and speed limiting between the two loops. This modification is shown in FIG. 3, wherein all the elements are the same as shown in FIG. 1 and are identified by like numerals with the exception of disk 74, which is replaced by cam 75, and cam 67, which has been replaced by disk 76. In the configuration of FIG. 3, the governor 11 remains connected to respond to the speed of the gas generator and to control the position of the lever 69 in response thereto, and the governor 12 remains connected to respond to free turbine speed and to control the position of lever 62 as a function thereof.

The disk 76 is secured to the shaft 68 and has a cylindrical outer surface of uniform radius with respect to the center of rotation of the shaft 68 such that the pivot point 63 of the lever 62 is held in a fixed position as the shaft 68 is rotated. The position of the pivot 63 is selected such that over the normal operating speed range of the free turbine, as represented by a range of positions of the lever 62 and a range of positions of the fuel flow control valve 50, the lever 62 remains out of contact with the flange 52 of the flow control valve. However, when the speed of the free turbine begins to exceed a preselected level, the lever 62 engages the flange 52 to limit the fuel flow rate to the engine. Any further attempts by the governor 11 to schedule a higher fuel flow by further counterclockwise rotation of the lever are ineffective because in this range the maximum fuel flow position of the valve 50 is limited by the lever 62. Thus in the arrangement shown in FIG. 3, the speed of the gas generator is scheduled manually by rotation of the shaft 68, the cam 75 being shaped to provide any preselected relationship between gas generator speed and angular position of the shaft 68, while the free turbine speed control loop, acting through the governor 12 and its associated mechanism, acts only as a speed limiter in response to a free turbine overspeed condition.

I thus provide, in the embodiment illustrated in FIGS. 1 and 3, a free turbine engine control system which can be modified to either of the abovementioned control philosophies merely by replacing two relatively inexpensive elements in the system.

In FIG. 2, I show an alternative embodiment of my invention. In this embodiment, the basic elements of the system are the same as shown in FIG. 1, and are identified by like numerals, except that here I use separate rotatable shafts 77 and 78 to control the angular positions of the cam 67 and a second cam 74a respectively.

The arrangement of FIG. 2 is illustrated as being connected to provide free turbine speed governing together with gas generator speed limiting. The angular position of the cam 74a can be adjusted by manual rotation of the shaft 78 to set the pivot point 70 to the desired position whereby fuel flow rate is limited in response to the attainment of a preselected gas generator speed at which limiting is desired to occur. After the cam 74a is adjusted, the shaft 78 is locked in position and the position of the pivot point 70 thereafter remains fixed in the operation of the control system. The shaft 77, which is connected to control the angular position of the cam 67, is connected to be controlled by throttle position to allow the free turbine speed to be set to any desired level within the operating speed range. The system then operates to perform the functions of free turbine speed governing and gas generator speed limiting in the same manner as the system shown in FIG. 1.

Now, if it is desired to modify the system of FIG. 2 to provide for manual control of gas generator speed together with free turbine speed limiting, it is necessary only to remove the throttle positioning connection from the shaft 77 and transfer it to the shaft 78. In making the modification, the shaft 77 is manually rotated to lift the pivot point 63 to the point where free turbine speed limiting is obtained at the preselected free turbine limit speed. The shaft 77 is then locked in position so that the position of the pivot 63 thereafter remains fixed in the operation of the control. The position of the pivot 70 is, on the other hand, now controlled by throttle position which determines the angular position of the cam 74a. It will be appreciated, of course, that in order to accommodate the type of modification contemplated in the embodiment of FIG. 2, the cams 74a and 67 must be shaped to provide the desired schedule relationship between throttle angle and speed for either mode of operation.

It will be seen from the foregoing that I have provided a control system for gas turbine engines of the free turbine type which is adaptable with only minor modifications to either of two modes of control, one providing for free turbine speed governing with gas generator speed limiting and the other providing for gas generator speed governing with free turbine speed limiting.

It will be appreciated that various modifications and substitutions may be made in the embodiments which I have presented herein. For example, the governors 11 and 12 may be replaced with other types and the various linkages through which the speed proportional signals are derived may be re-arranged in other forms. It will, of course, be apparent that various other modifications, substitutions and changes may be made in the embodiments of my invention presented herein without departing from its true scope and spirit as defined in the appended claims.

What I claim and desire to secure by Letters Patent of the United States is:

1. In a gas turbine engine having mechanically independent rotatable elements comprising a gas generator and a free power turbine, a fuel control comprising first governor means producing a first speed error signal in response to deviations in the speed of said gas generator from a preselected reference speed, means for setting the reference speed of said first governor means, second governor means producing a second speed error signal in response to deviations in the speed of said free power turbine from a preselected reference speed, means for setting the reference speed of said second governor means, means for regulating the fuel flow rate to said engine, means connecting said first and second speed error signals to said fuel flow rate regulating means to schedule the fuel flow rate to said engine to the minimum called for by either of said first and second speed error signals, means introducing a throttle input signal to said control, first removable means for connecting the throttle input signal to one of said reference speed setting means whereby the reference speed of one of said governor means is made adjustable in response to said throttle input signal and second removable means connecting said throttle input signal to the other of said speed reference setting means and making the other of said reference speed setting means insensitive to said throttle input signal, whereby either of said reference speed setting means associated with said first and second governor means may selectively be either adjustable in response to said throttle input signal or insensitive thereto.

2. Apparatus as set forth in claim 1 wherein said means for introducing the throttle input signal comprises a rotatable shaft and said first and second removable means comprise respectively cam means and a disk of uniform radius removably secured to said shaft to rotate therewith.

3. In a gas turbine engine having mechanically independent rotatable elements including a gas generator element and a free power turbine element, a fuel control comprising first governor means producing a first speed error signal in response to deviations in the speed of said gas generator element from a preselected reference speed, means connected to said first governor means for setting the reference speed of said first governor means, first cam means connected to actuate the reference speed setting means connected to said first governor means for setting the reference speed of said first governor means, second governor means producing a second speed error signal in response to deviations in the speed of said free power turbine element from a preselected reference speed, means connected to said second governor means for setting the reference speed of said second governor means, second cam means connected to actuate the reference speed setting means connected to said second governor means for adjusting the reference speed of said second governor means, means for regulating the fuel flow rate to said engine, means connecting said first and second speed error signals to said fuel flow rate regulating means to schedule the fuel flow rate to said engine to the minimum called for by either of said speed error signals, means introducing a throttle input signal to said control, and means for connecting either of said first and second cam means to said throttle input signal whereby either of said two reference speeds may be made adjustable in response to said throttle input signal and the other of said reference speeds may be manually set to a preselected level.

4. In a gas turbine engine having independently rotatable elements including a gas generator element and a free power turbine element, a fuel control comprising valve means for regulating the fuel flow rate to said engine, a first speed control loop connected to control the position of said valve means in response to deviations in the speed of said gas generator from a preselected reference speed, means adapted to be connected to a throttle position signal for setting the reference speed of said first speed control loop, a second speed control loop connected to control the position of said valve means in response to deviations in the speed of said free power element from a preselected reference speed, said first and second speed control loops being connected to said valve means such that the position of said valve corresponds to the minimum fuel flow rate being called for by either of said speed control loops, and means adapted to be connected to said throttle position signal for setting the reference speed of said second speed control loop, whereby the reference speed of a selected one of either of said speed control loops may be adjustable in response to the throttle position signal to provide speed governing control while the reference speed of the other of said speed control loops may be adjusted manually to a preselected level to provide a speed limiting function.

References Cited in the file of this patent
UNITED STATES PATENTS

| | | |
|---|---|---|
| 2,856,754 | Torell | Oct. 28, 1958 |
| 2,923,128 | Fortmann | Feb. 2, 1960 |

UNITED STATES PATENT OFFICE
CERTIFICATE OF CORRECTION

Patent No. 3,073,116                            January 15, 1963

Robert Frank Owens

It is hereby certified that error appears in the above numbered patent requiring correction and that the said Letters Patent should read as corrected below.

Column 4, line 39, for "expanded" read -- exposed --.

Signed and sealed this 20th day of August 1963.

(SEAL)
Attest:

ERNEST W. SWIDER
Attesting Officer

DAVID L. LADD
Commissioner of Patents